Patented Dec. 14, 1943

2,336,985

UNITED STATES PATENT OFFICE 2,336,985

COPOLYMERIZATION PRODUCT OF CELLULOSE COMPOUNDS AND METHOD OF PREPARING SAME

Ernest Freund, New York, N. Y.

No Drawing. Application September 7, 1940,
Serial No. 355,821

1 Claim. (Cl. 260—17)

My present invention relates to co-polymerized products obtained by subjecting a mixture containing at least two polymerizable substances to conditions under which both substances may undergo polymerization. More specifically my invention relates to co-polymerizates prepared from mixtures containing on the one hand polymerizable derivatives of carbohydrates of high molecular weight, such as starch, lichenine, glycogen, and particularly certain polymerizable cellulose derivatives, and on the other hand other suitable polymerizable compounds, and to a process for preparing such co-polymerizates.

The carbohydrate derivatives used in carrying out my invention are substituted by unsaturated radicals, and, in addition to the unsaturated radical or radicals, also by a saturated radical or radicals. Said unsaturated radicals may contain one or more double bonds. I prefer however, unsaturated radicals containing only one double bond. Carbohydrates which are substituted by crotonic, itaconic, fumaric, maleic acid, acrylic, methacrylic, or cinnamic acid, monoallylester of phthalic acid, monoallylester of maleic acid, or which contain unsaturated alkyl, aryl or aralkyl radicals, such as vinyl, allyl, methallyl, crotyl, and styryl groups, may be mentioned as examples of the unsaturated groups substituted in the carbohydrate derivatives used according to my invention. As saturated radicals substituted in the carbohydrate derivatives, organic radicals, such as acyl, alkyl, aralkyl radicals, and their functional derivatives may be mentioned, for example acetyl, propionyl, stearyl, lauryl, methyl, ethyl, benzyl, chloroacetyl, oxyethyl groups; as an inorganic radical the nitro group may be mentioned. Thus, for example, cellulose aceto-crotonate, cellulose nitro-crotonate, cellulose ethyl-allyl-ether, cellulose aceto-methacrylate, acetyl cellulose substituted by monoallylphthalate or mono-allyl-maleate, etc., may be used as a carbohydrate derivative, in carrying out my invention. Said carbohydrate derivatives are substantially soluble in organic solvents. The unsaturated radical contained in the substituted carbohydate molecule may be an easily polymerizable radical, such as the methallyl, methacryl or itaconic acid group, or a radical which is not easily polymerizable by itself, such as the crotonyl, malleyl, or allyl radical.

According to my invention, the carbohydrate derivatives are polymerized together with other suitable polymerizable compounds, i. e. with compounds which are capable of forming co-polymerizates with said carbohydrate derivatives. These substances may be easily polymerizable compounds, for example vinyl esters or vinyl ethers, such as vinyl acetate, vinyl chloride, vinyl chloroacetate, vinyl propionate, acrylic acid or methacrylic acid and their derivatives, such as nitrils, and esters of said acids, easily polymerizable olefins, styrene, itaconic acid, etc., or compounds which are not easily polymerizable by themselves such as crotonic acid and their derivatives, allyl esters or crotylamine, for example. Other unsaturated compounds which are not polymerizable by themselves may also be added to the co-polymerization mixture, provided of course that the addition of such compounds does not prevent the desired co-polymerization. Mixtures containing several carbohydrate derivatives of the above mentioned type and/or several other polymerizable compounds, and/or several of said compounds which are not easily polymerizable by themselves, may also be used. It is, however, necessary that the mixture to be co-polymerized according to my invention contains at least one easily polymerizable compound.

In carrying out my invention, soluble as well as insoluble co-polymerized products may be obtained. I have found that the solubility characteristics of the co-polymerizates obtained according to this invention depend on the amount of unsaturated radicals in the substituted carbohydrate molecule, provided that the other polymerizable components which are present in the co-polymerization mixture contain only one double bond in each molecule. If, under said conditions, said substituted carbohydrate molecule contains only a small amount of substituted, unsaturated radicals, soluble co-polymerizates are, as a rule, obtained, whereas co-polymerization, under similar conditions, of carbohydrate derivatives having a higher amount of substituted, unsaturated radicals, usually yields insoluble, co-polymerized products.

I have further found that in certain cases the amount of solvent used for dissolving the mixture to be co-polymerized, may also affect the solubility characteristics of the co-polymerized product obtained according to this invention. Other conditions being equal, the use of a larger amount of solvent promotes the formation of soluble co-polymerizates and prevents gelation, whereas in the presence of a relatively small amount of solvent, under otherwise similar conditions, insoluble products are obtained, which cannot be dissolved by subsequent addition of solvent. The soluble co-polymerizates obtained according to my process often show solubility characteristics which are different from those of the carbohydrate derivative used as a starting material.

If the carbohydrate derivatives are co-polymerized together with other polymerizable substances and modifying agents which contain more than one double bond in the molecule, such as methacrylic acid allyl ester, crotonic acid allyl ester, diallyl ester of phthalic acid, for example, insoluble co-polymerization products are obtained unless said substances are used in very small amounts of, for example, 0.1% or in certain cases up to 3% based on the amount of the other polymerizable products used.

The step of co-polymerization may be carried out according to my invention in any suitable manner, for example at ordinary room temperature or preferably at an elevated temperature, and at any suitable pressure. I prefer to effect co-polymerization by heating the dissolved compounds at a suitable temperature and to carry out co-polymerization in the presence of a suitable co-polymerization catalyst. Other methods of polymerization, such as exposure to ultraviolet light or polymerization of an emulsified mixture, may also be employed. Benzoyl peroxide, metallic oxides, such as manganese dioxide, metallic chlorides, such as stannic chlorides, may be used as co-polymerization catalysts.

The products obtained according to this invention may be used for various purposes, for the manufacture of textile threads, films, plastic masses, plastic binders, lacquers and varnishes, interlayers in safety glass structures, coating or impregnating agents for paper, cloth, porous materials, cements, dispersing agents, molding compositions, etc. Co-polymerization products containing cellulose derivatives and polymerizable basic nitrogen compounds or polymerizable carboxyl containing compounds may also be obtained according to my invention, and such co-polymerization products can be used for the manufacture of the threads which are capable of being dyed with acid or basic dyes, respectively.

*Example 1.*—A mixture of 10 parts by weight of crotonic acid and 51.5 parts by weight of acetic acid anhydride is boiled under reflux for about 120 minutes. After cooling the mixture to ordinary room temperature 30 parts by weight of acetic acid and 0.5 part by weight of concentrated sulfuric acid are added. 12 parts by weight of cellulose are introduced into the mixture thus obtained, and the cellulose containing mixture is stirred at 16°–24° C. for about 18–22 hours. Thereby a clear, viscous solution is obtained, from which cellulose aceto-crotonate is precipitated by the addition of water. Said cellulose aceto-crotonate is thoroughly washed with hot water and is then dried at a low temperature.

The cellulose aceto-crotonate thus obtained is used in carrying out the following co-polymerizations:

(a) 2 parts by weight of cellulose aceto-crotonate are dissolved in 10 parts by weight of chloroform, and 10 parts by weight of monomeric vinyl acetate and 0.1 part of benzoyl peroxide are added. These components are thoroughly mixed, and the mixture is heated under reflux at 80°–90° C. for about 8 hours. The viscous solution obtained is cast to films with or without the addition of plasticizing agents, such as butyl phthalate, prior to the casting. The softening point of the films thus obtained is substantially higher than that of films prepared under similar conditions from vinyl acetate only. A fraction of the co-polymerized produced prepared as described above, is soluble in ethyl alcohol.

(b) 1 part by weight of cellulose aceto-crotonate is dissolved in a mixture of 20 parts by weight of chloroform and 4 parts by weight of acetic acid, and to the solution 20 parts by weight of monomeric vinyl acetate and 0.2 part by weight of benzoyl peroxide are added. This solution is heated under reflux at 80°–90° C. for about 6 hours and is then cast to films having a lower softening point than those obtained according to (a).

(c) 1 part by weight of cellulose aceto-crotonate is dissolved in 5 parts by weight of chloroform and 2.5 parts by weight of acetic acid, and to the solution 20 parts by weight of monomeric vinyl acetate and 0.2 part by weight of benzoyl peroxide are added. By heating the solution thus obtained under reflux at 80°–90° C. for about 1 hour a co-polymerized gel is obtained, which is insoluble in organic solvents.

*Example 2.*—Cellulose aceto-crotonate is prepared as described in Example 1, using, however, 5 parts, instead of 10 parts, by weight of crotonic acid. The cellulose aceto-crotonate thus obtained is used for carrying out the following co-polymerization.

(a) 2 parts by weight of cellulose aceto-crotonate are dissolved in a mixture of 8 parts by weight of chloroform and 2 parts by weight of acetic acid, and to the solution 20 parts by weight of monomeric vinyl acetate and 0.2 part by weight of benzoyl peroxide are added. By heating the solution thus prepared under reflux at 80°–90° C. for about 2 hours, a gel-like co-polymerized product is formed, which is insoluble in organic solvents.

(b) 2 parts by weight of cellulose aceto-crotonate are dissolved in a mixture of 10 parts by weight of chloroform and 4 parts by weight of acetic acid. To the solution 10 parts by weight of monomeric vinyl acetate, 0.1 part by weight of benzoyl peroxide, and 0.05 part by weight of diallyl phthalate are added. The solution thus prepared is heated under reflux at 80°–90° C. for about 6 hours and the highly viscous solution formed thereby is cast to films.

(c) 2 parts by weight of cellulose aceto-crotonate are dissolved in 10 parts by weight of chloroform and to the solution 0.5 part by weight of crotonic acid, 10 parts by weight of monomeric vinyl acetate, and 0.1 part by weight of benzoyl peroxide are added. The solution thus prepared is heated under reflux at 80°–90° C. for 6 hours, and is then cast to films which have an increased affinity to and has an increased affinity to basic dyes.

(d) 2 parts by weight of cellulose aceto-crotonate are dissolved in a mixture of 10 parts by weight of chloroform and 2 parts by weight of acetic acid, and to the solution 0.3 part by weight of maleic acid anhydride, 10 parts by weight of monomeric vinyl acetate, and 0.1 part by weight of benzoyl peroxide are added. By heating the solution thus prepared under stirring and under reflux at 80°–90° C. for about 6 hours, a viscous, opaque solution is obtained, which is cast to films which show an increased capability of being dyed with basic dyes.

(e) 2 parts by weight of cellulose aceto-crotonate are dissolved in a mixture of 10 parts by weight of chloroform and 4 parts by weight of acetic acid, and to the solution 0.04 part by weight of benzoyl peroxide, 10 parts by weight of methyl methacrylate are added under stirring. The solution thus prepared is heated under reflux at 100° C. for about 8 hours, and the co-polymerized solution is cast to films.

(f) 2 parts by weight of cellulose aceto-crotonate are dissolved in a mixture of 10 parts by weight of chloroform and 1 part by weight of acetic acid, and to the solution 0.1 part by weight of vinyl acetate and 0.01 part by weight of benzoyl peroxide are added under stirring. The solution thus prepared is heated under reflux at 80°–90° C. for about 4 hours. The solution is then cast to films. These films are almost completely soluble in acetone, although only a small fraction of the starting material is soluble in acetone.

Example 3.—A mixture of 5 parts by weight of crotonic acid, and 51.5 parts by weight of acetic acid anhydride is boiled under reflux for about 120 minutes, and to the solution 33 parts by weight of acetic acid and 0.5 part by weight of conc. $H_2SO_4$ are added. The liquid is then mixed with 12 parts by weight of cellulose, and the mixture formed is treated in a kneading machine at 16°–24° C. for about 21 hours. Water is then added to the kneaded mass in an amount sufficient to decompose the excessive anhydride, and sodium acetate is added in an amount sufficient for converting sulfuric acid into sodium bisulfate. The solution thus formed is mixed under stirring with 30 parts by weight of chloroform, 90 parts by weight of monomeric vinyl acetate and 1 part by weight of benzoyl peroxide, and the solution formed is heated at 80°–90° C. for 5 hours. The solution is then cast into films.

Example 4.—79 parts by weight of crotonic acid and 342 parts by weight of acetic acid anhydride are heated under reflux, and then distilled until a small residue of about 20 parts by weight is left. 15 parts by weight of the distillate thus obtained are mixed with 15 parts by weight of acetic acid anhydride, and 0.2 part by weight of conc. $H_2SO_4$, and into the mixture obtained a solution of 51 parts by weight of a 13.5% solution of acetyl cellulose (having an acetic acid content of 54.5%) in acetone are introduced under stirring until a homogeneous mixture is obtained. This mixture is allowed to stand at 20° C. for 24 hours; the cellulose acetocrotonate is then precipitated with water, thoroughly washed with water and dried at a low temperature. The cellulose aceto-crotonate thus obtained is used in the following examples:

(a) 1.4 parts by weight of cellulose aceto-crotonate are dissolved in a mixture of 10 parts by weight of chloroform, and 5 parts by weight of acetic acid, and to the solution 15 parts by weight of monomeric vinyl acetate and 0.15 part by weight of benzoyl peroxide are added under stirring. By heating the solution thus obtained under reflux at 80°–90° C. for 3 hours, a gel-like product is obtained, which is substantially insoluble in organic solvents.

(b) By using under similar conditions 8 parts, instead of 15 parts by weight of vinyl acetate, a soluble co-polymerized product is obtained.

Example 5.—10.8 parts by weight of acetic acid anhydride, 3 parts by weight of maleic acid anhydride, and 0.18 part by weight of conc. sulfuric acid are mixed under stirring with 60 parts by weight of a 13.5% acetone solution of acetyl cellulose (containing 54.5% acetic acid), and the solution obtained is allowed to stand at 21° C. for 22 hours. The cellulose aceto-maleate formed is then precipitated with water, thoroughly washed with water and dried at a low temperature. 2 parts by weight of the cellulose aceto-maleate thus prepared are dissolved in a mixture of 10 parts by weight of chloroform, and 5 parts by weight of acetic acid, and to the solution 0.1 part by weight of benzoyl peroxide, and 10 parts by weight of vinyl acetate are added under stirring. The solution is heated under reflux at 80°–90° for 6 hours and is then cast to films.

Example 6.—1 part by weight of a cellulose ether containing 47.3% ethoxy-groups and 0.7% allyloxy-groups is dissolved in 10 parts by weight of toluene, and to the solution 4 parts by weight of monomeric styrene, and 0.0004 part by weight of benzoyl peroxide are added. A co-polymerized product is formed by heating the solution to 100° C.

Example 7.—1 part by weight of a cellulose ether as used in Example 6 is dissolved in 10 parts by weight of toluene, and to the solution 2 parts by weight of styrene, 0.07 part by weight of crotylamine and 0.0001 part by weight of benzoyl peroxide are added. Co-polymerization is effected by heating the solution to 100° C. Products obtained from the polymerized mass show an increased capability of being dyed with acid dyes.

Example 8.—A solution containing 30 parts by weight of monomeric vinyl chloride, 10 parts by weight of monomeric vinyl acetate, 40 parts by weight of acetone, 0.2 part by weight of benzoyl peroxide and 8 parts by weight of acetone soluble cellulose aceto-crotonate prepared as described in Example 5, are heated to 32° C. for 72 hours. The co-polymerized product has a high softening point, and exhibits substantial elasticity in plasticized condition.

Example 9.—1 part by weight of acetyl cellulose having an acetic acid content of 54.5% is treated with 15 parts of a liquid prepared by mixing 10 parts by weight of toluene and 2 parts by weight of acetone. The acetyl cellulose swells but does not dissolve in this mixture. 0.5 part by weight of crotonic acid anhydride are added to, and 4 parts by weight of anhydrous sodium crotonate are suspended in said mixture which is then heated at 90° C. for 16 hours. A fraction of the cellulose aceto-crotonate thus obtained is dissolved in a mixture of 10 parts by weight of chloroform and 1 part by weight of acetic acid, and to the solution 0.05 part by weight of benzoyl peroxide and 5 parts by weight of monomeric vinyl acetate are added under stirring. Co-polymerization is effected by heating the solution at 80°–90° C. for 6 hours. The co-polymerizate yields clear films having a high softening point.

Example 10.—A co-polymerized product was obtained in a manner similar to that described in Example 4 by the treatment of acetylated starch having an acetyl content of 52%. Instead of acetylated starch, acetylated lichenine or acetylated glycogen may be used in a substantially similar manner.

Example 11.—A cellulose derivative is prepared according to the process described in Example 2, in which, however, an equal amount of methacrylic acid is substituted for the crotonic acid used in Example 2. The cellulose aceto-methacrylate thus obtained is subjected to co-polymerization with vinyl acetate, in a manner similar to that described in Example 3.

In carrying out my present invention, instead of the carbohydrate derivatives mentioned in Examples 1 to 11 incl., or in mixture with the same, other carbohydrate derivatives of similar constitution, for example those mentioned in the above specification and mixtures of several other carbohydrate derivatives may be used. Furthermore, other co-polymerization components and/or other co-polymerization catalysts, such as hydrogen peroxide, manganese dioxide or stannic chloride, and/or other additions, modifiers, plasticizers, etc., may be partly or wholly substituted for those mentioned in the above examples.

As already mentioned above, I prefer to subject the starting materials used in a dispersed or dissolved condition to co-polymerization; the presence of a solvent, however, is not always necessary for carrying out my invention. Co-polymerization may be carried out in an atmosphere of air or of an inert gas, such as nitrogen. Co-polymerization may also be carried out according to my invention in the presence of plasticizers or other suitable additions. Modifying agents, such as diallyl phthalate or allyl crotonate may be added to the starting composition used in carrying out my invention. Such additions, when used in small quantities, such as 0.1-2%, calculated on the amount of the substances to be co-polymerized, increase the viscosity and/or the softening point of the co-polymerized product, they do not cause, however, the formation of insoluble co-polymerizates of inter-polymerizates; when used in larger amounts, however, they may cause formation of insoluble co-polymerizates.

The ratio between the individual substances present in the mixture to be co-polymerized, may vary in wide limits. The products obtained in carrying out this invention are formed at least partially by interpolymerization or co-polymerization, because such products, in contrast to mixtures or blended products, cannot be completely separated by extraction or similar means. I do not wish, however, to be limited to this theory. The co-polymerized products of this invention may be used per se or in combination or mixture with other products, such as natural or artificial resins, oils, driers, fillers, pigments, plasticizers, solvents, etc. The method of forming the individual ingredients to be co-polymerized is not a part of this invention.

It is to be understood that the present invention is not necessarily limited to the compositions and processes herein specifically illustrated and described, but may be carried out in other ways, without departure from its spirit, and within the scope of the appended claim.

I claim:

A process for obtaining a co-polymerization product, said process comprising the step of polymerizing a solution containing cellulose aceto-crotonate, vinyl acetate and benzoyl peroxide.

ERNEST FREUND.